United States Patent
Yamada

(10) Patent No.: US 7,360,791 B2
(45) Date of Patent: Apr. 22, 2008

(54) AIRBAG APPARATUS

(75) Inventor: Tadashi Yamada, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 344 days.

(21) Appl. No.: 11/085,118

(22) Filed: Mar. 22, 2005

(65) Prior Publication Data

US 2005/0212276 A1   Sep. 29, 2005

(30) Foreign Application Priority Data

Mar. 24, 2004   (JP)   ............................ 2004-087758

(51) Int. Cl.
   *B60R 21/16*   (2006.01)
(52) U.S. Cl. .................................... 280/743.2; 280/731
(58) Field of Classification Search ............. 280/728.1, 280/728.2, 731, 743.2
   See application file for complete search history.

(56) References Cited

U.S. PATENT DOCUMENTS

| | | | | |
|---|---|---|---|---|
| 5,044,663 A | * | 9/1991 | Seizert | ..................... 280/730.1 |
| 5,078,423 A | | 1/1992 | Fujita | |
| 5,350,188 A | * | 9/1994 | Sato | ........................... 280/739 |
| 5,358,273 A | | 10/1994 | Onishi et al. | |
| 5,452,915 A | * | 9/1995 | Fredin | ..................... 280/743.2 |
| 5,607,183 A | * | 3/1997 | Nishimura et al. | ...... 280/743.2 |
| 5,676,395 A | | 10/1997 | Oe et al. | |
| 5,848,805 A | * | 12/1998 | Sogi et al. | ................ 280/743.2 |
| 5,954,361 A | * | 9/1999 | Lang | ........................ 280/743.2 |
| 6,086,092 A | * | 7/2000 | Hill | ............................ 280/729 |
| 6,241,283 B1 | * | 6/2001 | Zarazua | .................... 280/743.2 |
| 6,598,903 B2 | * | 7/2003 | Okada et al. | ............ 280/743.2 |
| 2002/0017779 A1 | | 2/2002 | Gilpatrick et al. | |
| 2002/0036401 A1 | * | 3/2002 | Tokita et al. | ............ 280/743.2 |
| 2004/0041384 A1 | | 3/2004 | Drechsler et al. | |

FOREIGN PATENT DOCUMENTS

| | | |
|---|---|---|
| CN | 1443673 A | 9/2003 |
| EP | 0-838-377 | 10/1997 |
| GB | 2261-855 | 11/1992 |
| JP | U-6-51022 | 7/1994 |
| JP | 2003-260996 | 9/2003 |

* cited by examiner

*Primary Examiner*—Paul N. Dickson
*Assistant Examiner*—Tiffany L. Webb
(74) *Attorney, Agent, or Firm*—Posz Law Group, PLC

(57) ABSTRACT

An airbag apparatus comprises an airbag deployed between a vehicle and a passenger with gas generated by an inflator. The airbag comprises a first panel cloth, a second panel cloth attached to the first panel cloth, a reinforcement cloth fastened to the inner face of the second panel cloth, and tethers connecting the periphery of the reinforcement cloth to the first panel cloth. The center of the reinforcement cloth is disposed below the center of the second panel cloth. The tethers are disposed below the center of the reinforcement cloth. The inflator injects gas from the central portion of the first panel cloth towards the inside of the airbag. The airbag apparatus is preferably a driver's seat airbag apparatus.

13 Claims, 7 Drawing Sheets

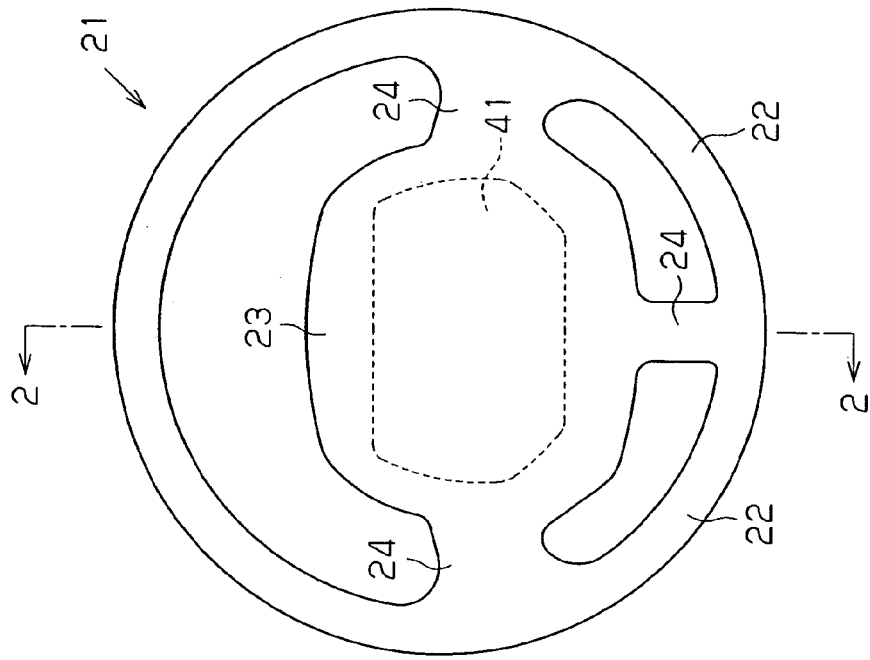
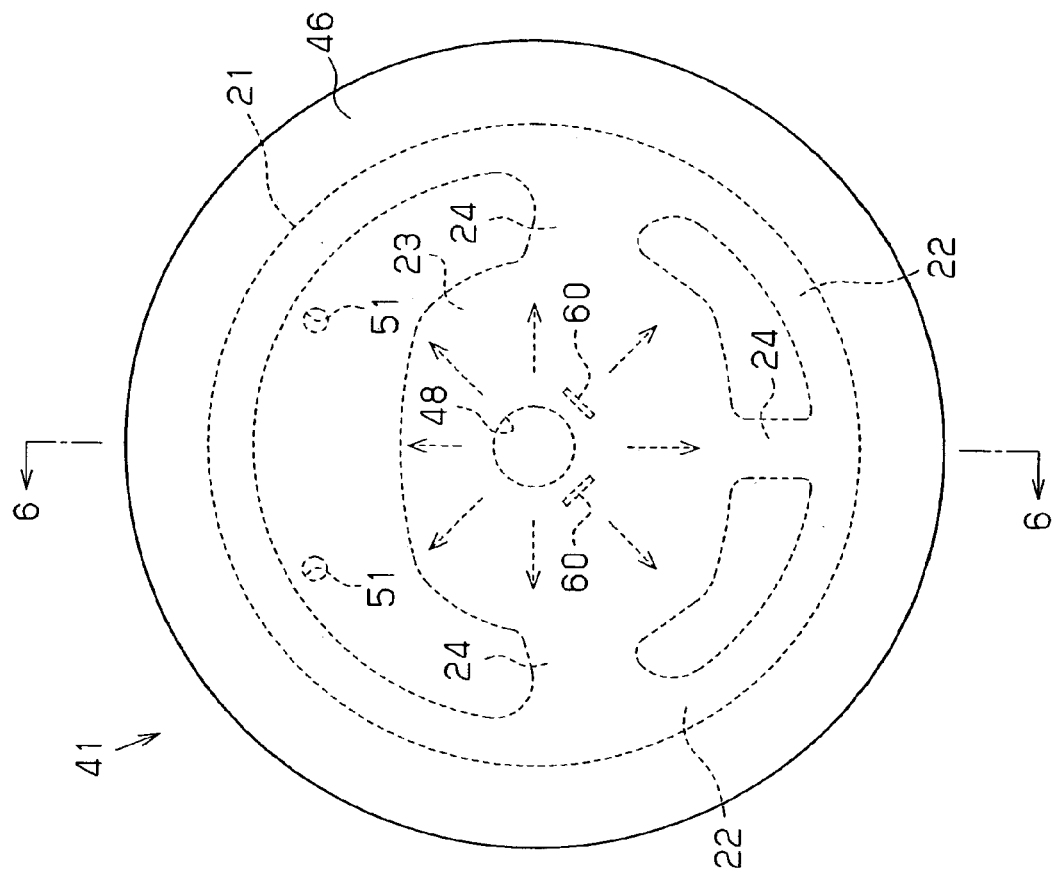

AIRBAG APPARATUS

BACKGROUND OF THE INVENTION

The present invention relates to a vehicle-mounted airbag apparatus, such as a driver's seat airbag apparatus installed at a central portion of a steering wheel. More particularly, the present invention relates to an airbag apparatus comprising an air bag which deploys between the vehicle and a passenger by means of a gas generated by a gas generator.

For example, a bag body for an airbag apparatus is disclosed in Japanese Laid-Open Utility Model Publication No. 6-51022. The bag body, disposed at a central portion of a steering wheel, expands between the steering wheel and a passenger upon sudden deceleration of a vehicle, and therefore is capable of protecting the passenger. In this bag body, a portion corresponding to the space between the lower portion of the steering wheel and the chest of the passenger expands less than a portion corresponding to the space between the upper portion of the steering wheel and the head of the passenger.

SUMMARY OF THE INVENTION

The present invention reflects diligent research by its inventors resulting in the development of an airbag apparatus with improved protection performance towards passengers as compared to conventional bag bodies. It is an objective of the present invention to provide an airbag apparatus with improved restraining performance towards passengers.

To achieve the foregoing and other objectives and in accordance with the purpose of the present invention, an airbag apparatus comprising an airbag deployed between a vehicle and a passenger with gas generated by a gas generator is provided. The airbag includes a first panel cloth, a second panel cloth, a reinforcement cloth, and a tether. The second panel cloth opposes the first panel cloth. The periphery of the second panel cloth is attached to the periphery of the first panel cloth. The second panel cloth faces the passenger during deployment. The reinforcement cloth is fastened to the inner face of the second panel cloth. The reinforcement cloth is formed so as to be smaller than the second panel cloth. The center of the reinforcement cloth is disposed lower than the center of the second panel cloth. The entire periphery of the reinforcement cloth is joined to the second panel cloth. The tether connects the reinforcement cloth and the first panel cloth to each other. The tether is provided at a location that is lower than the center of the reinforcement cloth. The gas generator injects gas from a central portion of the first panel cloth towards the inside of the airbag.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1A is a front view of a steering wheel according to one embodiment of the present invention;

FIG. 1B is a front view of the airbag during deployment thereof;

DETAILED DESCRIPTION OF THE PREFERRED EMBODIMENTS

Referring to the figures, a driver's seat airbag apparatus 40 according to one embodiment of the present invention mounted on a steering wheel 21 of a vehicle will be described below. For purposes of explaining directions, the traveling direction of the vehicle shall be referred to as "forward", while in relation to the airbag, "above", "underneath", "front" and "behind" shall be based upon an airbag 41 during deployment.

First, the steering wheel 21 to which the driver's seat airbag apparatus 40 is mounted will be described.

Figure 2:
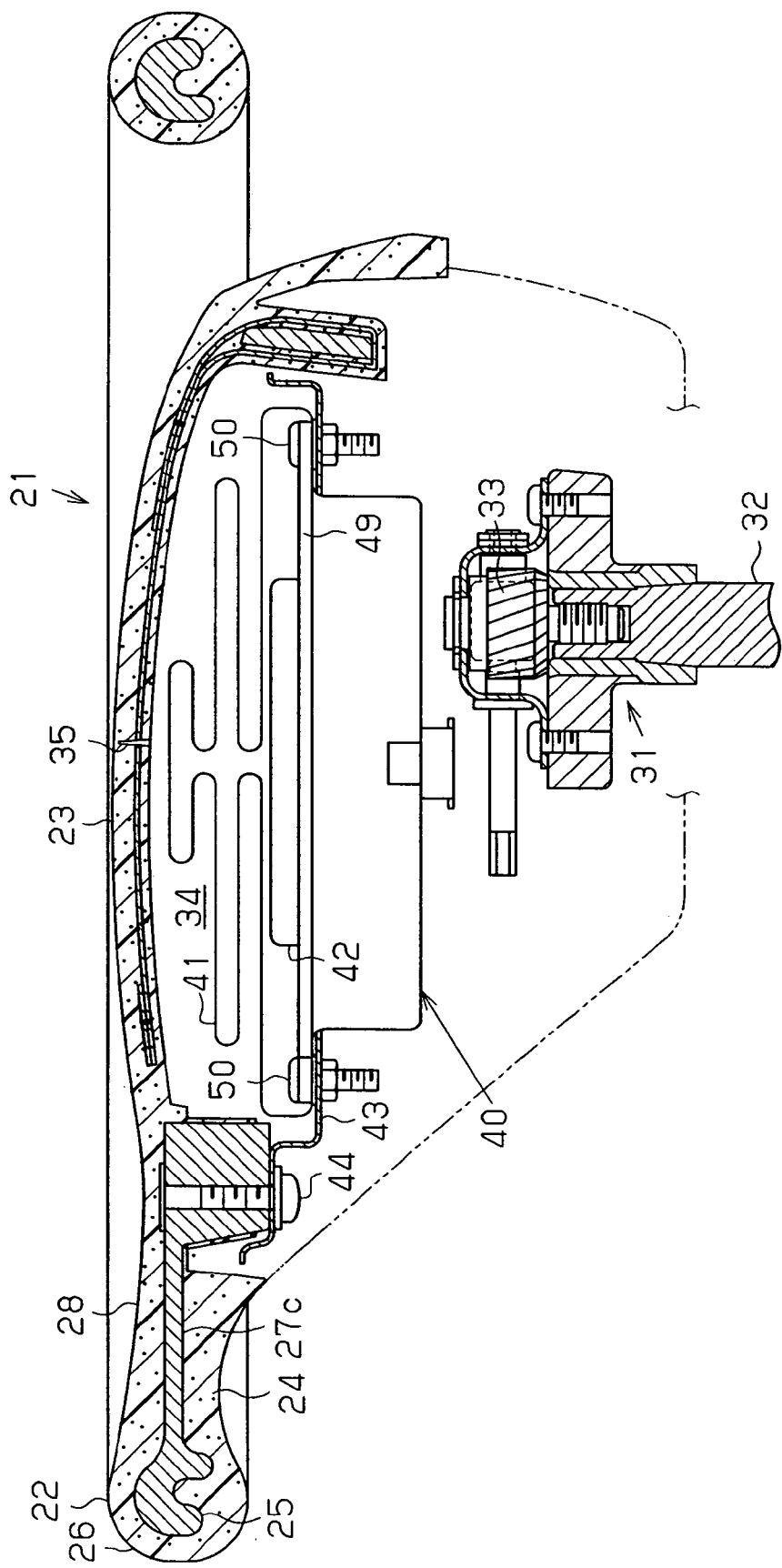
FIG. 2 is a cross-sectional view taken along line 2-2 in FIG. 1A.

As shown in FIGS. 1A and 2, the steering wheel 21 comprises a toroidal rim portion 22, a pad portion 23 provided at the central portion of the toroidal rim portion 22, and a plurality of spoke portions 24 (in this embodiment, three) extending from the inner periphery of the rim portion 22 towards the pad portion 23. The rim portion 22 comprises a rim portion core 25 constructed of a lightweight die-cast metal, and a sheathing body 26 which sheathes the rim portion core 25. The spoke portions 24 comprise first to third spoke portion cores 27a to 27c (refer to FIG. 3), constructed from the same metal as the rim portion core 25, and a sheathing body 28 which sheathes the first to third spoke portion cores 27a to 27c. The sheathing bodies 26 and 28 and the pad portion 23 are comprised of a flexible synthetic resin such as foamed polyurethane, and seamlessly sheathes the rim portion cores 25 and the spoke portion core 27a to 27c, made from die-cast metal.

Figure 3:
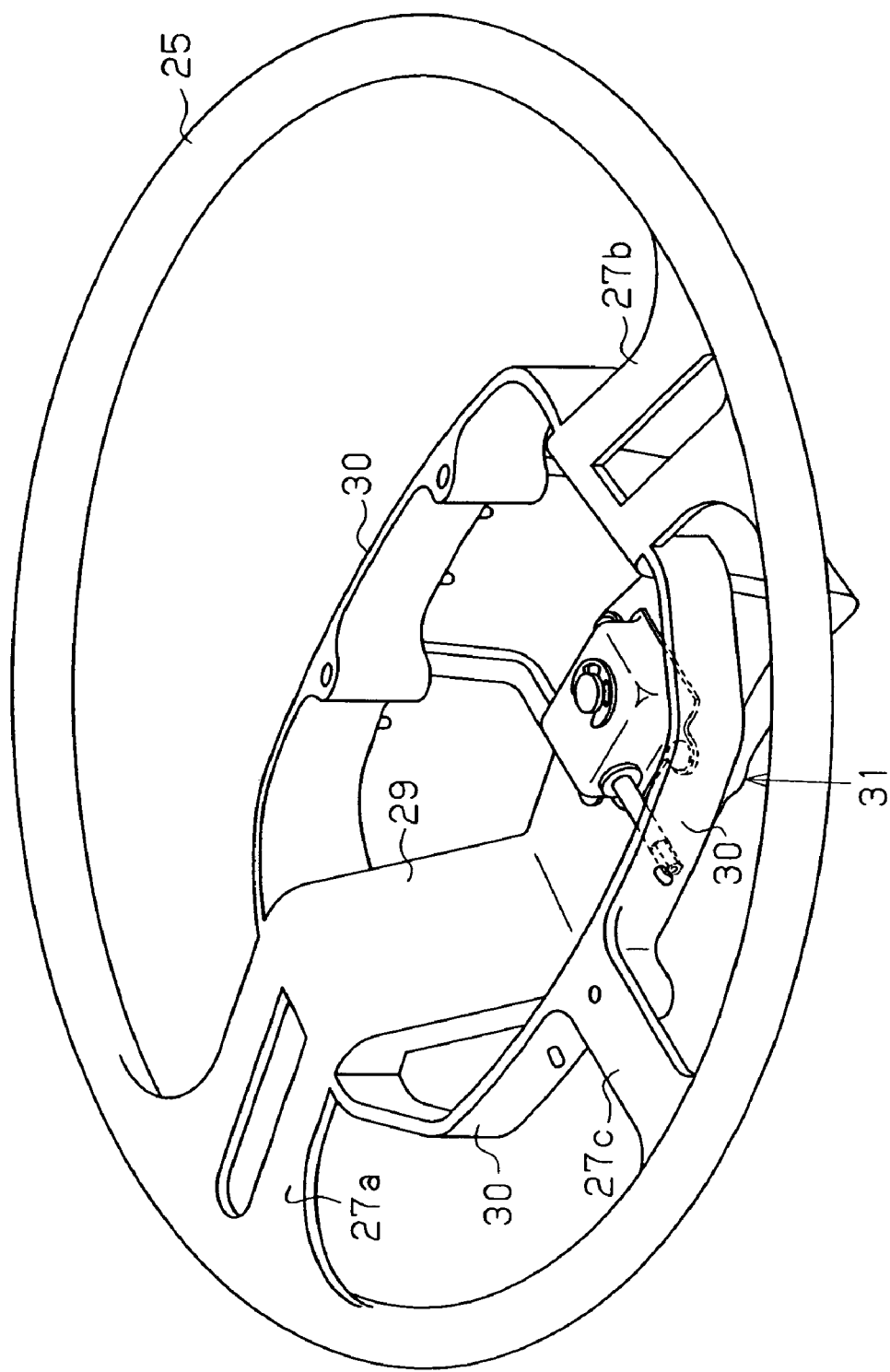
FIG. 3 is a perspective view of a core and a boss of the steering wheel.

As shown in FIG. 3, the first and second spoke portion cores 27a and 27b located on either side of the pad portion 23 are mutually connected via a first connecting portion 29 which has a U-shaped cross section, and an ellipsoidal second connecting portion 30. The third spoke portion core 27c is connected via the second connecting portion 30 to the first and second spoke portion cores 27a and 27b. A boss 31 is connected to the center of a base portion of the first connecting portion 29. In order to achieve integral rotation of the steering wheel 21 and a steering shaft 32, the boss 31 is connected via a gear connecting mechanism 33 to an end of the steering shaft 32.

As shown in FIG. 2, an accommodation recess portion 34 is provided underneath the pad portion 23 for accommodating an airbag apparatus 40. The airbag apparatus 40 comprises the folded airbag 41, an inflator 42 for generating the gas to be supplied to the inside of the airbag 41 for inflating the airbag 41, and a bag holder 43 which fixes the airbag 41 and the inflator 42 to the steering wheel 21. During operation of the airbag apparatus 40, the inflator 42 supplies gas to the inside of the airbag 41. The bag holder 43 is fixed to the first to third spoke portion cores 27a to 27c by screws 44. At the center of the back side of the pad portion 23, a notch portion 35 is provided for breaking the pad portion 23 as a result of an expansion of the airbag 41 during operation of the airbag apparatus 40.

Next, the airbag 41 will be described.

Figure 6:
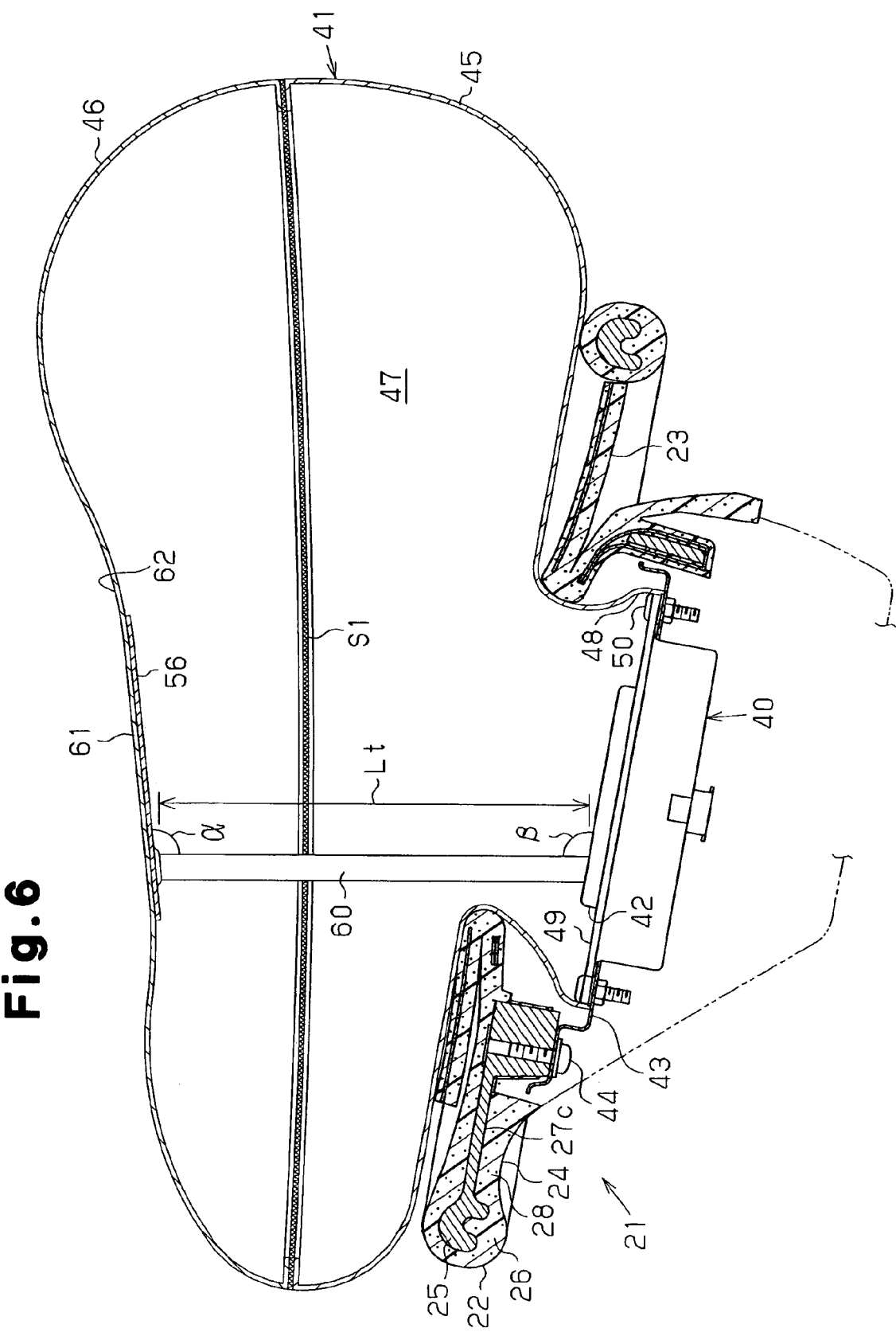
FIG. 6 is a cross-sectional view taken along line 6-6 in FIG. 1B.

As shown in FIGS. 1B and 6, the airbag 41 comprises a circular first panel cloth 45 and a circular second panel cloth 46 opposing the first panel cloth 45. Both panel cloths 45 and 46 are formed in similar sizes and shapes using a woven textile. The first panel cloth 45 is disposed so as to be closer to the steering wheel 21 than the second panel cloth 46, while the second panel cloth 46 is disposed so as to be closer to a passenger P than the first panel cloth 45. In other words, the first panel cloth 45 is disposed further towards the front of the vehicle than the second panel cloth 46.

Figure 4:
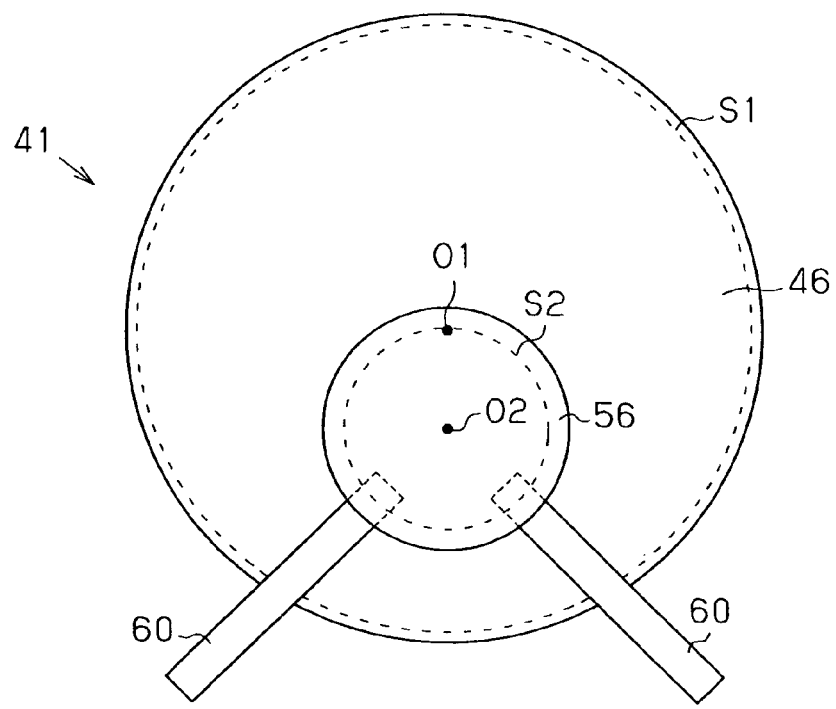
FIG. 4 is a view of an airbag turned over before being attached to the steering wheel, seen from the side of a second panel cloth.

The airbag 41 is manufactured by first overlapping the first panel cloth 45 onto the second panel cloth 46 so that their peripheries match, then sewing the entire peripheries by a sewing thread, thereby forming a seam S1 (refer to FIG. 4), and finally turning the sewn panel cloths 45 and 46 inside-out. FIG. 4 shows the airbag 41 before being turned inside-out, while FIG. 6 shows the airbag 41 after being turned inside-out. Since the seam S1 firmly attaches the two panel cloths 45 and 46, it blocks exchange of air between the inside and outside of the airbag 41 throughout the entire peripheries of the two panel cloths 45 and 46. As a result, the airbag 41 expands further towards the rear of the vehicle as than the steering wheel 21, thereby forming a bag portion 47 between the two panel cloths 45 and 46.

As shown in FIGS. 1B and 6, a circular aperture 48 is formed at the central portion of the first panel cloth 45 so as to correspond to the bag holder 43. At a periphery of the aperture 48, the airbag 41 is fixed via a retainer 49 to the bag holder 43 by a plurality of bolts 50. During operation of the airbag apparatus 40, the aperture 48 functions as an inflow port to inflow the gas generated by the inflator 42 to the inside of the bag portion 47 of the airbag 41. A pair of vent holes 51 is formed on the upper portion of the first panel cloth 45 to discharge gas inside the bag portion 47 to the outside of the airbag 41.

As shown in FIGS. 4 and 6, a circular reinforcement cloth 56 made from the same woven textile as the second panel cloth 46, and a pair of strip-shaped tethers 60 made from the same woven textile is provided on the back side of the second panel cloth 46 which comprise the inner face of the air bag 41. Both of the tethers 60 are formed so that they are equal in length.

The reinforcement cloth 56 is formed so as to be smaller than the second panel cloth 46. The reinforcement cloth 56 is disposed on the second panel cloth 46 in order to receive the high pressure of the gas injected by the inflator 42, and as a result prevents deformation of the expanding airbag 41 and allows a favorable deployment of the airbag 41. The reinforcement cloth 56 is fastened to the back side of the second panel cloth 46 at a location offset in a lower direction from the center of the second panel cloth 46. In other words, the center of the reinforcement cloth 56 is lower than the center of the second panel cloth 46. In this embodiment, as shown in FIG. 4, a central point O1 of the second panel cloth 46 is located higher than a central point O2 of the reinforcement cloth 56. A seam S2 is formed at the periphery of the reinforcement cloth 56 by sewing the entire periphery of the reinforcement cloth 56 to the second panel cloth 46 using sewing thread.

As shown in FIG. 6, the proximal portions of both tethers 60 disposed at the front portion of the airbag 41 are sewn to the periphery of the aperture 48, and together with the first panel cloth 45 are fixed to the bag holder 43 via the retainer 49. The distal ends of both tethers 60 are disposed at the rear portion of the airbag 41, and are sewn to the inside face of the second panel cloth 46. During deployment of the airbag 41, the tethers 60 are pulled in a substantially horizontal orientation by the central portion of the first panel cloth 45 and the central portion of the second panel cloth 46. Therefore, the second panel cloth 46 is prevented from excessively expanding towards the rear of the vehicle, and as a result the airbag 41 is kept in an appropriate shape.

As indicated by the dotted line in FIG. 1B, the proximal portions of both tethers 60 are both fixed to the first panel cloth 45 at locations that are lower than the center of the first panel cloth 45. The proximal portions of both tethers 60 are disposed so as to be symmetrical in relation to the first panel cloth 45. As shown in FIG. 4, the distal ends of both tethers 60 are both sewn to the periphery of the reinforcement cloth 56 at locations that are lower than the central point O2 of the reinforcement cloth 56. These distal ends of the tethers 60 are respectively fixed at locations that are symmetrical in relation to the reinforcement cloth 56. Additionally, the distal ends of the tethers 60 are sandwiched between the second panel cloth 46 and the reinforcement cloth 56, and are sewn to both the second panel cloth 46 and the reinforcement cloth 56 at the seam S2.

Figure 7:
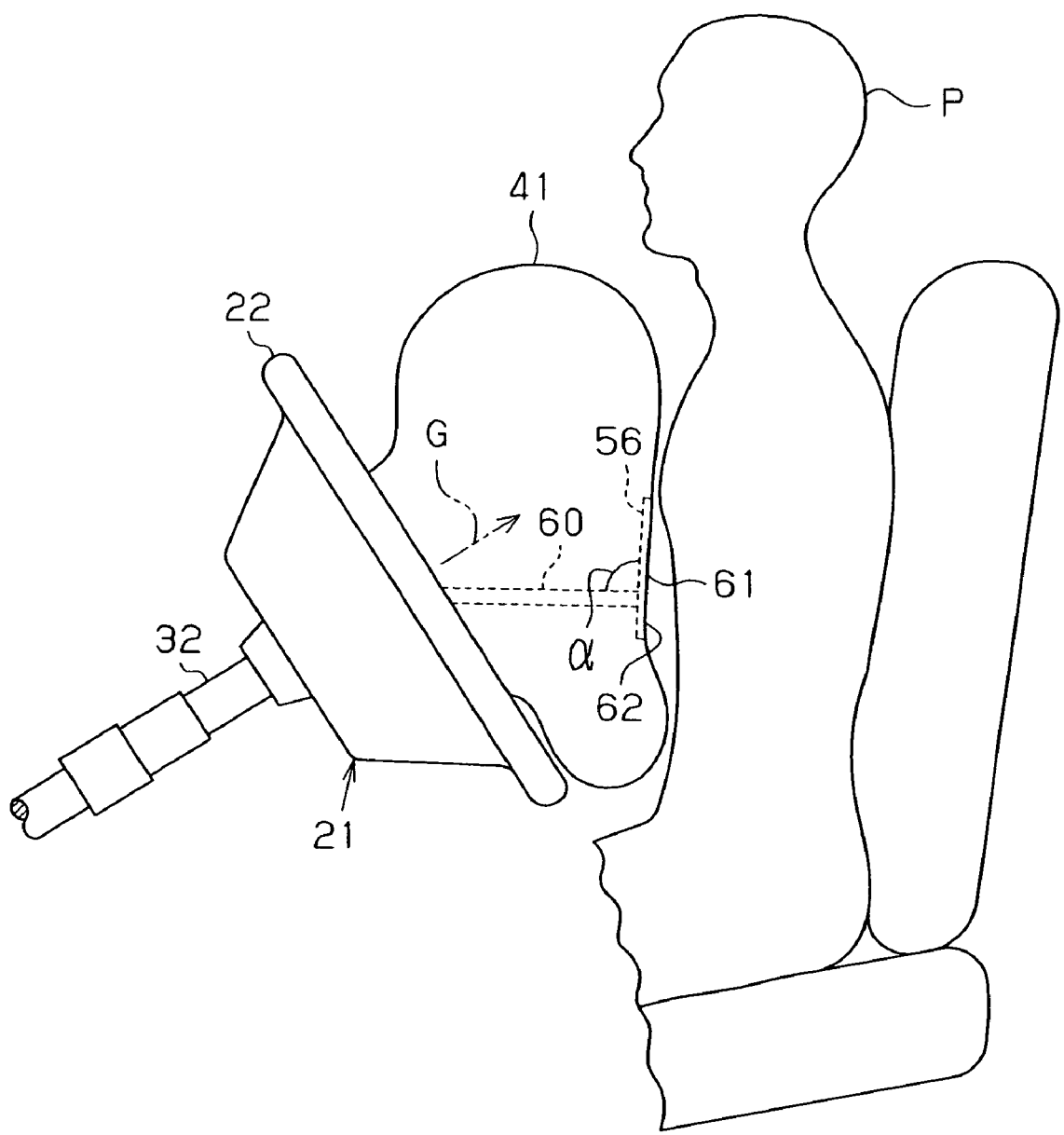
FIG. 7 is the side view of an airbag during deployment thereof.

As shown in FIGS. 6 and 7, during deployment of the airbag 41, the gas generated by the inflator 42 is first injected into the airbag 41 through the aperture 48, and the gas pushes open the space between the two panel cloths 45 and 46 to enlarge the volume of the bag portion 47. The primary stream G (refer to the chain double-dashed line in FIG. 7) of the gas generated by the inflator 42 is injected towards the rear of the vehicle, from the central portion of the first panel cloth 45 to the central portion of the second panel cloth 46. At this point, the primary stream G of the gas presses the central portion of the second panel cloth 46 towards the rear of the vehicle via the reinforcement cloth 56.

Since the entire periphery of the reinforcement cloth 56 is connected to the second panel cloth 46 at seam S2, misalignment of the reinforcement cloth 56 in relation to the second panel cloth 46 is avoided, meanwhile ensuring that the reinforcement cloth 56 moves in an integrated fashion with the second panel cloth 46. Therefore, the reinforced portion 61 of the second panel cloth 46 to which the reinforcement cloth 56 is connected, has a higher shape retention than the other portions of the second panel cloth 46, and is less likely to become deformed even when the reinforced portion 61 is placed under the high pressure of the gas injected from the inflator 42 during the expansion of the airbag 41, and maintains a substantially tabular shape.

In the airbag 41, since the reinforcement cloth 56 is provided at a location offset in a lower direction compared to the center of the second panel cloth 46, the primary stream G of the gas presses the upper portion of the reinforcement cloth 56 towards the rear of the vehicle. Therefore, the higher up on the reinforced portion 61 of the second panel cloth 46, the greater the incline towards the rear of the vehicle. In other words, as shown in FIGS. 6 and 7, the angle α between the tether 60 and the reinforcement cloth 56 becomes an obtuse angle. As a result, the primary stream G of the gas is preferentially directed to the upper portion of the bag portion 47, and the upper portion of the airbag 41 expands significantly. Since greater expansion of the upper portion of the airbag 41 means that the wide space between the steering wheel 21 and the head region of the passenger P will be filled, improved restraining performance in regards to the head of the passenger P will be achieved.

Moreover, since the distal ends of both tethers 60 disposed at the rear portions of the airbag 41 are connected to the lower portion of the reinforcement cloth 56, the second panel cloth 46 located at the vicinity of the distal ends of the tethers 60 will not excessively expand towards the rear of the vehicle. Therefore, in this airbag 41, the expansion towards the rear of the vehicle is greater the higher up the airbag 41, resulting in increased restraining performance in regards to the head region of the passenger P.

In addition, in the airbag 41, the proximal portions of the tethers 60 disposed at the front portion of the airbag 41 are fixed at positions that are offset lower than the center of the first panel cloth 45 (i.e. gas injection hole of the inflator 42). Therefore, when the primary stream G of the gas presses the reinforcement cloth 56, the distal ends of the tethers 60 are more likely to travel along a circular arc, with the proximal portions of the tethers 60 as the center, towards the lower portion of the airbag 41. In other words, as shown in FIG. 6, the angle β formed between the tether 60 and the retainer 49 (i.e. the plane of rotation of the steering wheel 21) will be an obtuse angle.

Therefore, in a deployed airbag 41, a recess 62, shifted so as to be lower than the center of the airbag 41, will be formed on the outer surface of the second panel cloth 46 in the vicinity of the distal ends of the tethers 60. Additionally, the lower portion of the airbag 41 (i.e. the portion that is lower than the distal ends of the tethers 60) will have a lesser degree of expansion in comparison with the other portions of the airbag 41, and will become thinner. Conversely, due to the preferential influx of the gas, and the fact that both angles α and β are obtuse angles, the upper portion of the airbag 41 will have a greater degree of expansion in comparison with the central and lower portions of the airbag 41, and therefore will become thicker.

As a result, as shown in FIG. 7, the deployed airbag 41 will form an inverted triangle when viewed from the side. Thus, the lower portion of the airbag 41 can easily make its way into the narrow gap between the lower portion of the steering wheel 21 and the chest region (and abdominal region) of the passenger P, and will easily fill the wide gap between the upper portion of the steering wheel 21 and the head of the passenger P. Furthermore, in this airbag 41, since the second panel cloth 46 forms a substantially parallel and flat face in relation to the chest region of the passenger P, the airbag 41 has an improved restraining performance towards the entire upper body of the passenger P.

Figure 5:
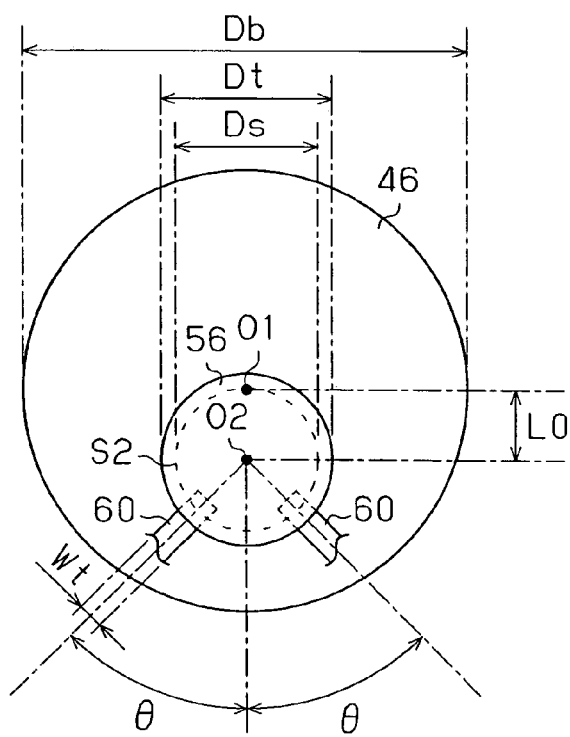
FIG. 5 is a view of a back side of the second panel cloth.

In the airbag 41, as shown in FIG. 5, the diameter Db of the second panel cloth 46 is preferably 600 to 800 mm, and more preferably be 650 to 710 mm, and is set at 680 mm for this embodiment. When the diameter Db of the second panel cloth 46 is less than 600 mm, the size of the airbag 41 during deployment will be small, and may reduce the restraining performance of the airbag 41 towards at least one of the head or the chest of the passenger P. Conversely, when the diameter Db of the second panel cloth 46 is more than 800 mm, the volume of the bag portion 47 will become large and may decrease the deployment velocity of the airbag 41. Incidentally, when the second panel cloth 46 assumes an elliptical or a polygonal shape, the major axis (i.e. maximum width) of its second panel cloth 46 is preferably 800 mm or less, or more preferably be 710 mm or less, and the minor axis (i.e. minimum width) is preferably 600 mm or more, or more preferably be 650 mm or more. The diameter of the circle formed by seam S1 and the diameter of the first panel cloth 45 should be equal to the diameter Db of the second panel cloth 46.

The diameter Dt of the reinforcement cloth 56 is preferably 200 to 400 mm, and more preferably be 250 to 350 mm, and is set at 340 mm for this embodiment. When the diameter Dt of the reinforcement cloth 56 is less than 200 mm, the reinforced portion 61 of the second panel cloth 46 will be smaller, making it difficult for the gas injected by the inflator 42 to strike the reinforced portion 61, and therefore making it difficult for the airbag 41 to deploy itself in an inverted triangular shape as viewed from the side. Conversely, when the diameter Dt of the reinforcement cloth 56 is more than 400 mm, it will become difficult for the reinforcement cloth 56 and the second panel cloth 46 to move in an integrated manner, and the reinforced portion 61 of the second panel cloth 46 will more likely become deformed during deployment of the airbag 41. Incidentally, when the reinforcement cloth 56 assumes an elliptical or a polygonal shape, the major axis (i.e. maximum width) of the reinforcement cloth 56 is preferably 400 mm or less, or more preferably be 350 mm or less, and the minor axis (i.e. minimum width) is preferably 200 mm or more, or more preferably be 250 mm or more.

The diameter Ds of the circle formed by the seam S2 is preferably 160 to 360 mm, and more preferably be 210 to 310 mm, and is set at 300 mm for this embodiment. When the diameter Ds of the aforementioned circle is less than 160 mm, the reinforced portion 61 of the second panel cloth 46 will substantially be smaller, thereby making it difficult for the airbag 41 to deploy itself in an inverted triangular shape as viewed from the side. Conversely, when the diameter Ds of the aforementioned circle is more than 360 mm, the reinforced portion 61 will become too big, thereby making it difficult for the reinforcement cloth 56 and the second panel cloth 46 to move in an integrated manner. Incidentally, when the seam S2 assumes an elliptical or a polygonal shape, the major axis (i.e. maximum width) of the shape formed by the seam S2 is preferably 360 mm or less, or more preferably be 310 mm or less, and the minor axis (i.e. minimum width) is preferably 160 mm or more, or more preferably be 210 mm or more.

The offset Lo of the reinforcement cloth 56 in regards to the second panel cloth 46, in other words the distance between the central points O1 and O2, is preferably 10 to 100 mm, and more preferably be 30 to 80 mm, and is set at 50 mm for this embodiment. When the offset Lo of the reinforcement cloth 56 is less than 10 mm, the effect of inclining the reinforced portion 61 of the second panel cloth 46 further towards the rear of the vehicle the higher up in the reinforced portion 61 will be reduced, thereby making it difficult for the airbag 41 to deploy itself in an inverted triangular shape as viewed from the side. Conversely, when the offset Lo of the reinforcement cloth 56 is more than 100 mm, it will make it difficult for the gas injected by the inflator 42 to strike the reinforced portion 61, thereby making it difficult for the airbag 41 to deploy itself in an inverted triangular shape as viewed from the side. Incidentally, since the central points O1 and O2 are points that are uniquely determined as they are respectively located at the height-wise center of the second panel cloth 46 and the reinforcement cloth 56, the central points O1 and O2 will not be influenced by the shapes of the second panel cloth 46 or the reinforcement cloth 56.

The straight line passing through the intersection of the across-the-width center of each tether 60 and the outer periphery of the reinforcement cloth 56 and extending to the central point O2 is inclined at an angle θ in relation to a plumb line passing through the central point O2. This angle θ is preferably 0 to 70 degrees, and more preferably be 30 to 60 degrees, and is set at 45 degrees for this embodiment. When the angle θ is more than 70 degrees, the effect of inclining the reinforced portion 61 of the second panel cloth 46 further towards the rear of the vehicle the higher up in the reinforced portion 61 will be reduced, thereby making it difficult for the airbag 41 to deploy itself in an inverted triangular shape as viewed from the side.

The width Wt of the tether 60 is preferably 70 to 130 mm, and more preferably be 80 to 120 mm, and is set at 100 mm for this embodiment. When the width Wt of the tether 60 is less than 70 mm, it becomes more likely that the tether 60 will have insufficient strength, thereby making it difficult for the airbag 41 to deploy itself in an inverted triangular shape as viewed from the side. Conversely, when the width Wt of the tether 60 is more than 130 mm, it becomes economically unfeasible.

As shown in FIG. 6, the length Lt of the tether 60 excluding the joints with the panel cloths 45 and 46 is preferably 100 to 300 mm, and more preferably be 200 to 250 mm, and is set at 220 mm for this embodiment. When the length Lt of the tether 60 is less than 100 mm, the recess formed at the reinforced portion 61 of the second panel cloth 46 is likely to become excessive, thereby creating higher risk of the deployed airbag 41 to be deformed, resulting in inadequate protection of the passenger P. Furthermore, the tether 60 becomes more likely to be severed by the high pressure of the gas injected by the inflator 42 during deployment of the airbag 41. Conversely, when the length Lt of the tether 60 is more than 300 mm, it becomes more difficult to thinly deploy the lower portion of the airbag 41, thereby making it difficult for the airbag 41 to deploy itself in an inverted triangular shape as viewed from the side. Additionally, in order to avoid excessive expansion of the airbag 41 towards the rear of the vehicle, the length Lt of the tether 60 is preferably shorter than the maximum widths of the first and second panel cloths 45 and 46, and should more preferably be shorter than the minimum widths of the first and second panel cloths 45 and 46.

Next, the operation of the aforementioned airbag apparatus 40 will be described.

Firstly, when a vehicle receives an impact which exceeds a predetermined level, an impact sensor (not shown) mounted on the vehicle generates a detection signal which ignites the inflator 42. The ignition of the inflator 42 generates a large volume of gas inside the inflator 42.

The gas generated by the inflator 42 flows through the aperture 48 and is supplied to the inside of the airbag 41 which is in a folded state, and initiates the deployment of the airbag 41. During expansion of the airbag 41, when the second panel cloth 46 comes into contact with the inner face of the pad portion 23, the expansion of the airbag 41 is temporarily restricted, while the inner pressure of the bag portion 47 increases. When the inner pressure of the bag portion 47 exceeds a predetermined threshold, the airbag 41 pushes the pad portion 23 upward from the inside, and breaks open the pad portion 23 via the notch portion 35. As a result, the airbag 41 exposes itself to the outside through the pad portion 23, and deploys towards the side of the passenger P.

As shown in FIGS. 6 and 7, when the gas generated by the inflator 42 raises the inner pressure of the bag portion 47 so as to apply tension to the tethers 60, the primary stream G of the gas starts to flow constantly towards the upper portion of the reinforcement cloth 56. At this point, the reinforced portion 61 of the second panel cloth 46, while receiving the pressing force of the primary stream G of the gas, maintains a substantially tabular shape, and inclines towards the rear of the vehicle, the higher up on the reinforced portion 61 the greater the incline. As a result, the primary stream G of the gas is preferentially directed towards the upper portion of the bag portion 47, and the upper portion of the airbag 41 expands rapidly and significantly.

Furthermore, at this point, the pressing force of the primary stream G of the gas pushes the reinforced portion 61 of the second panel cloth 46 downwards, and displaces the tethers 60 and the reinforced portion 61 towards a predetermined direction so as to make both angles α and β obtuse. As a result, the upper portion of the airbag 41 approaches the close vicinity of the head region of the passenger P, while the lower portion of the airbag 41 is displaced downward to be inserted between the lower portion of the steering wheel 21 and the chest region of the passenger P. At this point, since the thickness of the lower portion of the airbag 41 is restricted by the tethers 60, the airbag 41 forms a generally inverted triangular shape as viewed from the side. In other words, this shape of the side of the airbag 41 corresponds to the shape of the gap between the rear face of the steering wheel 21 and the passenger P, and thereby enables the airbag 41 to appropriately restrain the entire upper body of the passenger P.

Therefore, according to the present embodiment, the following advantages are obtained.

The airbag 41 comprises tethers 60 which connect the periphery of the reinforcement cloth 56 fastened to the inner face of the second panel cloth 46, and the central portion of the first panel cloth 45. In addition, the airbag apparatus 40 comprises the inflator 42 which injects gas from the central portion of the first panel cloth 45 to the central portion of the second panel cloth 46. Therefore, since the deployed airbag 41 is restricted so as to remain thin by the tethers 60, the deployed airbag 41 forms a shape wherein the area facing the passenger P is enlarged. Thus, the deployed airbag 41 is able to restrain the passenger P so that it broadly covers the upper body of the passenger P.

The reinforced portion 61 to which the reinforcement cloth 56 is attached is provided on the second panel cloth 46 of the airbag 41. Since the reinforced portion 61 is reinforced by the reinforcement cloth 56, the reinforced portion 61 maintains a substantially flat state while expanding during the deployment of airbag 41. Therefore, the reinforced portion 61 broadens the area of the second panel cloth 46 that is able to contact the passenger P, and thereby is effective to disperse and uniformize the impact to reach the passenger P.

Since the reinforcement cloth 56 is fastened to a location offset downwards from the center of the second panel cloth 46, the upper portion of the deployed airbag 41 expands rapidly and significantly, thereby achieving improved restraining performance towards the head region of the passenger P. Furthermore, since the tethers 60 restrict the protruding of the reinforcement cloth 56, the lower portion of the deployed airbag 41 can deploy thinly.

Since the tethers 60 are attached to the periphery of the reinforcement cloth 56 disposed lower than the center of the reinforcement cloth 56, the upper portion of the deployed airbag 41 expands significantly, while the lower portion of the deployed airbag 41 expands thinly. Therefore, since the airbag 41 forms a shape corresponding to the gap between the steering wheel 21 and the driver, the airbag 41 improves restraining performance that is particularly required in driver's seat airbags. Moreover, in this airbag apparatus 40, since the proximal portions of the tethers 60 disposed at the front portion of the airbag 41 are provided at locations that are offset downwards from the inflator 42, the lower portion of the deployed airbag 41 can easily be drawn downwards, providing excellent retraining performance in regards of the chest region of the passenger P.

Since a pair of the tethers 60 is provided at the periphery on either side of the reinforcement cloth 56 with the reinforcement cloth 56 in between the pair, the shape of the airbag 41 during and after deployment may be more easily stabilized. Additionally, since the pair of the tethers 60 is disposed so as to be symmetrical with respect to the reinforcement cloth 56, the airbag 41 during and after deployment can be stabilized without any wobbling movements.

It should be apparent to those skilled in the art that the present invention may be embodied in many other specific forms without departing from the spirit or scope of the invention. Particularly, it should be understood that the invention may be embodied in the following forms.

Figure 8A:
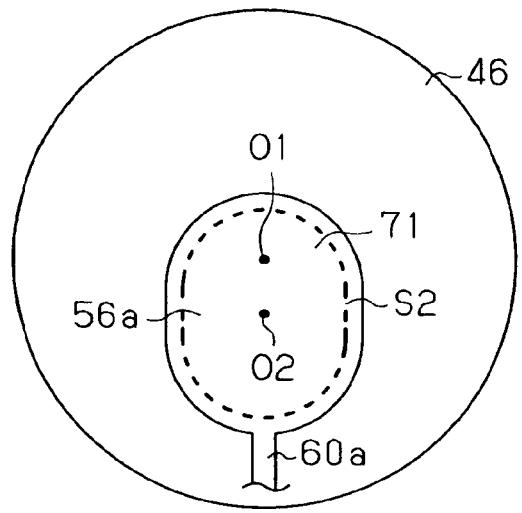
FIG. 8A is a view of a back side of a second panel cloth according to another embodiment of the present invention.

As shown in FIG. 8A, a reinforcement cloth 56a may be formed in an elliptical shape. Similarly, a reinforcement cloth 56 can be formed in a quadrangular, pentagonal, hexagonal, octagonal, dodecagonal, icosagonal or any other polygonal shape. In particular, the reinforcement cloth 56 is preferably formed in a polygonal shape with many sides (substantially circular or substantially elliptical).

The first panel cloth 45 and the second panel cloth 46 may be formed in an elliptical shape. Similarly, both panel cloths 45 and 46 may be formed in a polygonal shape. In particular, both panel cloths 45 and 46 are preferably formed in a polygonal shape with many sides.

Figure 8B:
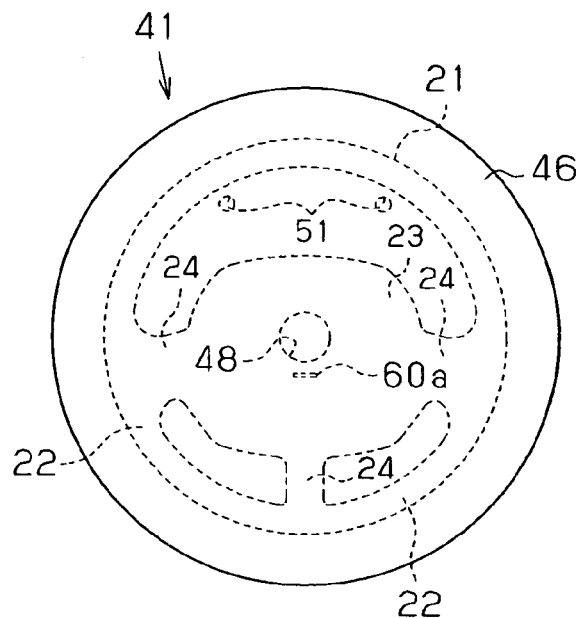
FIG. 8B is a view of the airbag of FIG. 8A, during deployment thereof.

As shown in FIGS. 8A and 8B, only one tether 60a may be provided in the airbag 41. In this case, the tether 60a should be provided at the lower portion of the reinforcement cloth 56a.

Figure 9A:
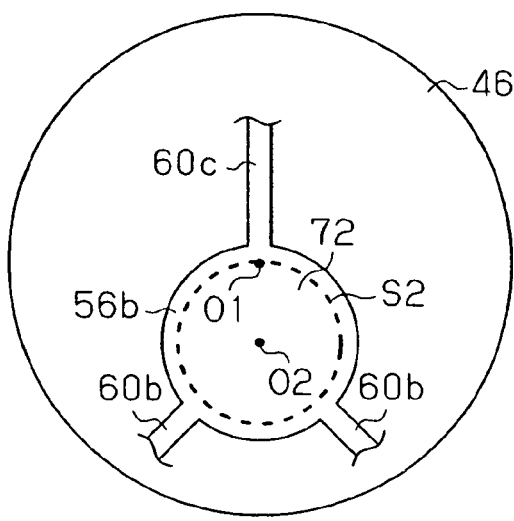
FIG. 9A is a view of a back side of a second panel cloth according to yet another embodiment of the present invention.
Figure 9B:
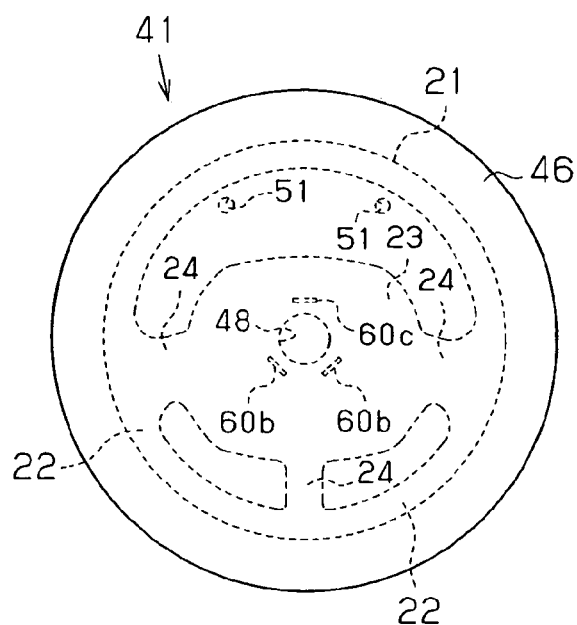
FIG. 9B is a view of the airbag of FIG. 9A, during deployment thereof.

As shown in FIGS. 9A and 9B, a pair of tethers 60b may be provided at the lower portion of a reinforcement cloth 56b so that each tether 60b is on opposite sides of the reinforcement cloth 56b, while an upper tether 60c may be provided at the upper portion of the reinforcement cloth 56b. Incidentally, the tethers 60b should be configured in the same manner as the tether 60 in the aforementioned embodiment, while the upper tether 60c should be formed so as to be longer than the tethers 60b. In this case, the thickness of the upper portion of the deployed airbag 41 can be adjusted with greater ease. Alternatively, a plurality of upper tethers 60c may be provided above the center of the reinforcement cloth 56b.

Three or more tethers may be provided at the lower portion of the reinforcement cloth 56. When providing three tethers, the tethers should be comprised of a pair of tethers 60 as described in the aforementioned embodiment, and a single tether (corresponding to the tether 60a in FIG. 8A) provided at the lower portion of the reinforcement cloth 56.

As shown in FIG. 8A, a reinforcement cloth 56a and a tether 60a may be configured seamlessly as an integrated member. In this case, the reinforcement cloth 56a and the tether 60a should be constructed from a single sheet of a woven textile 71. Alternatively, as shown in FIG. 9A, a reinforcement cloth 56b, both tethers 60b and an upper tether 60c may be configured seamlessly as an integrated member. In this case, the reinforcement cloth 56b, the tethers 60b and the upper tether 60c should be constructed from a single sheet of a woven textile 72. In this case, since the airbag 41 can be manufactured with greater ease, the manufacturing cost of the airbag apparatus 40 can easily be reduced.

The proximal portion of each tether 60 may be attached to the height-wise center of the first panel cloth 45. This will similarly enable the deployed airbag 41 to be drawn downwards.

The respective peripheries of the first panel cloth 45 and the second panel cloth 46 may be attached either by welding or by using adhesives. Similarly, the periphery of the reinforcement cloth 56 and the second panel cloth 46 may be attached either by welding or by using adhesives. Similarly, in addition to the periphery of the reinforcement cloth 56, the central portion of the reinforcement cloth 56 and the second panel cloth 46 may be attached either by sewing, welding or by using adhesives.

The primary stream G of the gas may be injected, for instance, towards the upper portion of the second panel cloth 46. Similarly, the gas injected from the inflator 42 may be radially injected from the aperture 48 towards the periphery (i.e. seam S1) of the airbag 41. In this case, while the effect of the primary stream G of the gas directly pressing the reinforced portion 61 will be reduced, since the distal ends of the tethers 60 disposed at the rear portion of the airbag 41 are offset downwards from the center of the reinforcement cloth 56, both angles $\alpha$ and $\beta$ will be obtuse angles.

Therefore, the present examples and embodiments are to be considered as illustrative and not restrictive and the invention is not to be limited to the details given herein, but may be modified within the scope and equivalence of the appended claims.

What is claimed is:

1. An airbag apparatus mounted on a steering wheel having a toroidal rim portion and comprising an airbag deployed between a vehicle and a passenger with gas generated by a gas generator, the airbag comprising:
   a first panel cloth;
   a second panel cloth opposing the first panel cloth, wherein a periphery of the second panel cloth is attached to a periphery of the first panel cloth, and the second panel cloth faces the passenger during deployment;
   a reinforcement cloth fastened to an inner face of the second panel cloth, wherein the reinforcement cloth is formed so as to be smaller than the second panel cloth, and a center of the reinforcement cloth is disposed lower than the center of the second panel cloth, wherein an entire periphery of the reinforcement cloth is joined to the second panel cloth; and
   a tether connecting the reinforcement cloth and the first panel cloth to each other, wherein the tether is provided at a location that is lower than the center of the reinforcement cloth, wherein
   the gas generator injects gas from a central portion of the first panel cloth towards an inside of the airbag,
   the tether is attached to the first panel cloth below the center of the first panel cloth,
   the tether is connected to the second panel cloth at a location that is below a location at which the tether is connected to the first panel cloth,
   the first panel cloth is formed substantially concentrically with the toroidal rim of the steering wheel, and
   both the first and second panel cloths are formed to have similar sizes.

2. The airbag apparatus according to claim 1, wherein the tether is one of a plurality of tethers provided at the periphery of the reinforcement cloth, and the plurality of tethers include at least a pair of tethers disposed on either side of the reinforcement cloth.

3. The airbag apparatus according to claim 2, wherein the pair of tethers is disposed so as to be symmetrical with the reinforcement cloth in between the tethers.

4. The airbag apparatus according to claim 3, wherein the pair of tethers is configured to be equal in length.

5. The airbag apparatus according to claim 1, wherein the tether protrudes from a lower periphery of the reinforcement cloth.

6. The airbag apparatus according to claim 1, wherein the tether is attached to the second panel cloth while being sandwiched between the second panel cloth and the reinforcement cloth.

7. The airbag apparatus according to claim 1, wherein the tether is attached to the first panel cloth below the gas generator.

8. The airbag apparatus according to claim 1, wherein a distance of the central point of the second panel cloth and a central point of the reinforcement cloth is set to be between 10 to 100 mm, inclusive.

9. The airbag apparatus according to claim 1, wherein the gas generator injects gas towards a central portion of the second panel cloth.

10. The airbag apparatus according to claim 1, wherein the gas generator injects gas a central portion of the second panel cloth.

11. The airbag apparatus according to claim 1, wherein an outer face of the airbag corresponding to the reinforcement cloth forms a recess during deployment of the airbag.

12. The airbag apparatus according to claim 11, wherein the recess is shifted downwards from the center of the second panel cloth.

13. The airbag apparatus according to claim 1, wherein the airbag apparatus is a driver's seat airbag apparatus.

* * * * *